United States Patent
Abed et al.

(10) Patent No.: US 11,268,839 B2
(45) Date of Patent: Mar. 8, 2022

(54) RESISTIVE FLOW SENSOR

(71) Applicant: Silicon Microstructures, Inc., Milpitas, CA (US)

(72) Inventors: Omar Abed, San Jose, CA (US); Gertjan van Sprakelaar, Fremont, CA (US); Justin Gaynor, Mountain View, CA (US)

(73) Assignee: MEASUREMENT SPECIALTIES, INC., Hampton, VA (US)

(*) Notice: Subject to any disclaimer, the term of this patent is extended or adjusted under 35 U.S.C. 154(b) by 49 days.

(21) Appl. No.: 16/734,359

(22) Filed: Jan. 5, 2020

(65) Prior Publication Data

US 2020/0284632 A1    Sep. 10, 2020

Related U.S. Application Data (60) Provisional application No. 62/814,253, filed on Mar. 5, 2019.

(51) Int. Cl.
| | |
|---|---|
| *G01F 1/69* | (2006.01) |
| *G01F 1/684* | (2006.01) |
| *G01F 1/696* | (2006.01) |
| *G01F 15/14* | (2006.01) |
| *G01F 1/692* | (2006.01) |
| *G01F 15/02* | (2006.01) |

(52) U.S. Cl.
CPC .............. *G01F 1/69* (2013.01); *G01F 1/6847* (2013.01); *G01F 1/696* (2013.01)

(58) Field of Classification Search
CPC .......... G01F 1/69; G01F 1/6847; G01F 1/696; G01F 1/6842; G01F 15/14; G01F 1/6845; G01F 1/692; G01F 15/022
See application file for complete search history.

(56) References Cited

U.S. PATENT DOCUMENTS

| | | | |
|---|---|---|---|
| 4,542,650 A * | 9/1985 | Renken | G01F 1/6965 |
| | | | 338/319 |
| 4,888,988 A | 12/1989 | Lee et al. | |
| 5,014,552 A | 5/1991 | Kamiunten et al. | |
| 5,050,429 A | 9/1991 | Nishimoto et al. | |
| 5,291,781 A | 3/1994 | Nagata et al. | |

(Continued)

FOREIGN PATENT DOCUMENTS

| | | |
|---|---|---|
| EP | 0137687 A1 | 4/1985 |
| EP | 1568999 A2 | 8/2005 |

(Continued)

OTHER PUBLICATIONS

Low Pressure Digital Sensor M6X21 Series, Datasheet, Silicon Microstructures, Inc., 2016, 11 pages.

(Continued)

*Primary Examiner* — David L Singer
*Assistant Examiner* — Anthony W Megna Fuentes (57) ABSTRACT

Reliable flow sensors with enclosures that have predictable thermal variations and reduced mechanical tolerances for a more consistent fluid flow and more consistent flow measurements. Thermal variations can be made predictable by using etched structures in silicon blocks. Mechanical tolerances can be reduced using lithography and high-precision semiconductor manufacturing equipment and techniques.

11 Claims, 7 Drawing Sheets

(56) References Cited

U.S. PATENT DOCUMENTS

| | | | |
|---|---|---|---|
| 5,392,647 A * | 2/1995 | Manaka | G01F 1/6842 73/204.26 |
| 5,412,993 A | 5/1995 | Ohtani | |
| 5,423,212 A * | 6/1995 | Manaka | G01F 1/6845 73/204.26 |
| 5,656,773 A | 8/1997 | Neda | |
| 5,804,720 A | 9/1998 | Morimasa et al. | |
| 6,579,740 B2 | 6/2003 | Toyoda | |
| 6,615,655 B1 | 9/2003 | Sakai et al. | |
| 6,655,207 B1 | 12/2003 | Speldrich et al. | |
| 6,672,154 B1 | 1/2004 | Yamagishi et al. | |
| 6,725,731 B2 | 4/2004 | Wiklund et al. | |
| 6,813,944 B2 | 11/2004 | Mayer et al. | |
| 7,028,559 B2 | 4/2006 | Oort | |
| 7,255,001 B1 | 8/2007 | Davis et al. | |
| 8,061,219 B2 | 11/2011 | Rezgui et al. | |
| 8,695,418 B2 * | 4/2014 | Sparks | G01F 1/78 73/204.26 |
| 2016/0161951 A1 * | 6/2016 | Hornung | G01N 33/0027 137/2 |
| 2017/0097252 A1 * | 4/2017 | Huang | G01F 1/692 |
| 2017/0336240 A1 | 11/2017 | Daneyshar | |
| 2018/0319587 A1 | 11/2018 | Aston | |
| 2019/0078914 A1 | 3/2019 | Doering | |

FOREIGN PATENT DOCUMENTS

| | | | |
|---|---|---|---|
| EP | 2381225 A1 | 10/2011 | |
| WO | 2004038344 A1 | 5/2004 | |

OTHER PUBLICATIONS

Kuo. Jonathan T.W., et al., "Micromachined Thermal Flow Sensors—A Review," Micromachines, 2012, vol. 3, pp. 550-573.

Niedenfur, Patrick, "Understanding the different between absolute, gage and differential pressure," First Sensor Blog [online], [retrieved on Dec. 20, 2019], Retrieved from the Internet <URL: https://blog.first-sensor.com/en/select-pressure-sensors/, 7 pages.

Flow and Pressure Measurement in Respiratory Medical Equipment SM9000 and SM6000, YouTube Video, Silicon Microstructures, Inc., May 22, 2017, [online], [retrieved on Dec. 20, 2019], Retrieved from the Internet <URL: https://www.youtube.com/watch?time_continue=2&v=ixWh0bJysVw&feature=emb_logo>, 1 page.

D6F-W Dust Segregation System, Omron Electronic Components LLC, YouTube Video on Manufacturing.NET, Nov. 4, 2008, [online], [retrieved on Dec. 20, 2019], Retrieved from the Internet <URL: https://www.youtube.com/watch?v=lcToiyypo9s>, 1 page.

"MEMS flow sensor is dust resistant." EETimes [online], Dec. 17, 2007, [retrieved on Dec. 20, 2019], Retrieved from the Internet <URL: https://www.eetimes.com/mems-flow-sensor-is-dust-resistant/>, 2 pages.

HTD Series—Digital Differential Pressure Sensors, Data Sheet [online], First Sensor, [retrieved on Jan. 10, 2020], Retrieved from the Internet: <URL: https://www.first-sensor.com/cms/upload/datasheets/DS_Standard-HTD_E_11824.pdf>; 14 pages.

Piezoresistive manifold HTD low pressure sensors from 1 mbar, YouTube Video, First Sensor, Nov. 13, 2017, [online], [retrieved on Jan. 10, 2020], Retrieved from the Internet <URL: https://www.youtube.com/watch?v=zVuoSgyqBNQ&feature=emb_logo>, 1 page.

HTD Amplified Pressure Sensors, Data Sheet [online], First Sensor, [retrieved on Jan. 10, 2020], Retrieved from the Internet: <URL: https:/www.first-sensor.com/en/products/pressure-sensors/amplified-pressure-sensors/htd/>, 4 pages.

WBI Series Mass Flow Sensors for Gases, Data Sheet [online], First Sensor, [retrieved on Jan. 10, 2020], Retrieved from the Internet: <URL: https://www.first-sensor.com/en/products/how-sensors/mass-flow-sensors-for-gases/>, 5 pages.

Krassow, H., et al., "The smart-orifice meter: a mini head meter for volume flow measurement," Flow Measurement and Instrumentation, 1999, vol. 10, pp. 109-115.

Extended European Search Report, European Application No. 20161161.3-1001, European Filing Date, dated Jul. 22, 2020.

Notice of Allowance dated Jan. 15, 2020 in U.S. Appl. No. 16/129,355, 8 pages.

* cited by examiner

RESISTIVE FLOW SENSOR

CROSS-REFERENCES TO RELATED APPLICATIONS

This application claims priority to U.S. provisional application No. 62/814,253, filed Mar. 5, 2019, which is incorporated by reference.

BACKGROUND

There is a large demand for small, reliable flow sensors. MEMS devices based on the concept of heat transfer are a commercially successful technology. Despite their market success, the currently-available devices have similar designs and thus share some of the same performance and manufacturing drawbacks.

Flow sensors, which can be referred to as hot-wire anemometers, can consist of at least two resistors. One resistor can be made of a refractory material that heats to a controllable temperature when current is passed through it. The second resistor can be a sense resistor, and can be unheated. A current can be driven through this sense resistor and the resulting voltage measured in order calculate its resistance.

When the flow sensor is operating, a current in the refractory resistor can cause the refractory resistor to heat up. As a gas or other fluid flows over the refractory resistor to the sense resistor, heat can be transferred from the refectory resistor to the sense resistor. This can cause the sense resistor to heat up, which in turn can cause the resistance of the sense resistor to change. This change in resistance can be measured, and from this change the flow rate can be determined.

The flow of a gas or other fluid in a flow sensor can be partially dependent on the shape and contours of an enclosure housing the flow sensor. But the size and shape of these enclosures can change as the temperature of the enclosure changes. These temperature-dependent variations can be problematic, particularly when they are unpredictable. Also, the size and shape of these enclosures can be subject to manufacturing tolerances. These variations can lead to changes in the flow rate to be measured and to measurement inconsistencies.

Thus, what is needed are reliable flow sensors with enclosures that have predictable thermal variations and reduced mechanical tolerances for a more consistent fluid flow and more consistent flow measurements.

SUMMARY

Accordingly, embodiments of the present invention can provide reliable flow sensors with enclosures that have predictable thermal variations and reduced mechanical tolerances for a more consistent fluid flow and more consistent flow measurements.

An illustrative embodiment can provide flow sensors having improved enclosures. These enclosures can include channels for a gas or other fluid. The channels can be formed using lithography and high-precision semiconductor manufacturing equipment and techniques to reduce their mechanical tolerances. This can tighten or reduce the variations in the size, shape, and volume of the channels, thereby leading to flow rate measurements having an improved consistency.

These and other embodiments of the present invention can provide channels in flow sensor enclosures that are formed of monolithic blocks of silicon. Using a silicon block can provide a channel with highly predictable and repeatable thermomechanical properties that can readily be accounted for, thereby providing more consistent measurements.

In these and other embodiments of the present invention, a first silicon block can be attached to a second silicon block, thereby forming a channel. This first silicon block can include one or more refractory resistors and one or more sense resistors. These resistors can have a circular, polygonal, or other shape. They each can be formed as a spiral, such as an Archimedean spiral, involute, Fermat, or other type of spiral. They each can be formed as one or an array of lines. The can have the same or similar shapes as each other, or they can have different shapes. A refractory resistor can be formed around an inner sense resistor. In these and other embodiments, a sense resistor can be formed around an inner refractory resistor. An exit passage for fluid flow can be formed as a hole through the second silicon block, where the sense and refractory resistors are formed around the exit passage. The channel in the second silicon block and the exit passage in the first silicon block can form a flow path for gas or other fluid through the flow sensor, where fluid flows through the channel and out the exit passage. In these and other embodiments of the present invention, the exit passage can be an inlet and fluid can flow in the inlet and out the channel. In these and other embodiments of the present invention, there might not be an exit passage or inlet in the first silicon block. In this configuration, fluid flow can be through the channel in the second silicon block.

These and other embodiments of the present invention can provide a bidirectional flow sensor. In one case, the fluid can flow from the refractory resistor over the sense resistor. This can result in an increase in the temperature of the sense resistor, and therefore in its resistance. This increase in resistance can be measured. Alternatively, fluid can flow from the sense resistor over the refractory resistor. In this case, the temperature of the sense resistor can be reduced as gas or fluid heated by the refractory resistor is being carried away from the sense resistor towards the refractory resistor.

In these and other embodiments of the present invention, a second silicon block forming a channel can be attached to a first silicon block. The exit passage can be absent or omitted from the first silicon block. This first silicon block can include one or more refractory resistors and one or more sense resistors. These resistors can have a circular, polygonal, or other shape. They each can be formed as a spiral, such as an Archimedean spiral, involute, Fermat, or other type of spiral. They each can be formed as one or an array of lines. The can have the same or similar shapes as each other, or they can have different shapes. A refractory resistor can be formed on a first side of a sense resistor. In these and other embodiments, a sense resistor can be formed on the first side of a refractory resistor. The channel can have an inlet on a first end and an outlet or exit passage on a second end, where fluid flows from the inlet to the outlet or exit passage.

In these and other embodiments of the present invention, a first silicon block forming a channel can be attached to a second silicon block, a board, housing, or other substrate. The first silicon block can include one or more refractory resistors and one or more sense resistors. These resistors can be formed in the channel in the first silicon block. These resistors can have a circular, polygonal, or other shape. They each can be formed as a spiral, such as an Archimedean spiral, involute, Fermat, or other type of spiral. They each can be formed as one or an array of lines. The can have the same or similar shapes as each other, or they can have different shapes. A refractory resistor can be formed on a first side of a sense resistor. In these and other embodiments, a sense resistor can be formed on the first side of a refractory resistor. The channel can have an inlet on a first end and an outlet or exit passage on a second end, where fluid flows from the inlet to the outlet or exit passage.

Several variations of this basic design can be implemented, such as concentric-ring resistors or resistors mounted on thin membranes to reduce thermal mass, among others.

Various embodiments of the present invention can incorporate one or more of these and the other features described herein. A better understanding of the nature and advantages of the present invention can be gained by reference to the following detailed description and the accompanying drawings.

DESCRIPTION OF ILLUSTRATIVE EMBODIMENTS

Conventional flow sensors can provide flow rate measurements that are dependent on the movement of gases over sense and refectory resistors. This movement of gas can in turn depend on the geometry of an enclosure in which the sensor is held. At the dimensional scales involved, thermal coefficients of expansion of the walls of the enclosure, as well as tolerances in their dimensions, can meaningfully affect measured flow rate values, as can any external torqueing or other mechanical effects. Accordingly embodiments of the present invention can provide a device architecture to reduce measurement uncertainty associated with thermal and mechanical factors influencing the enclosure.

Figure 1:
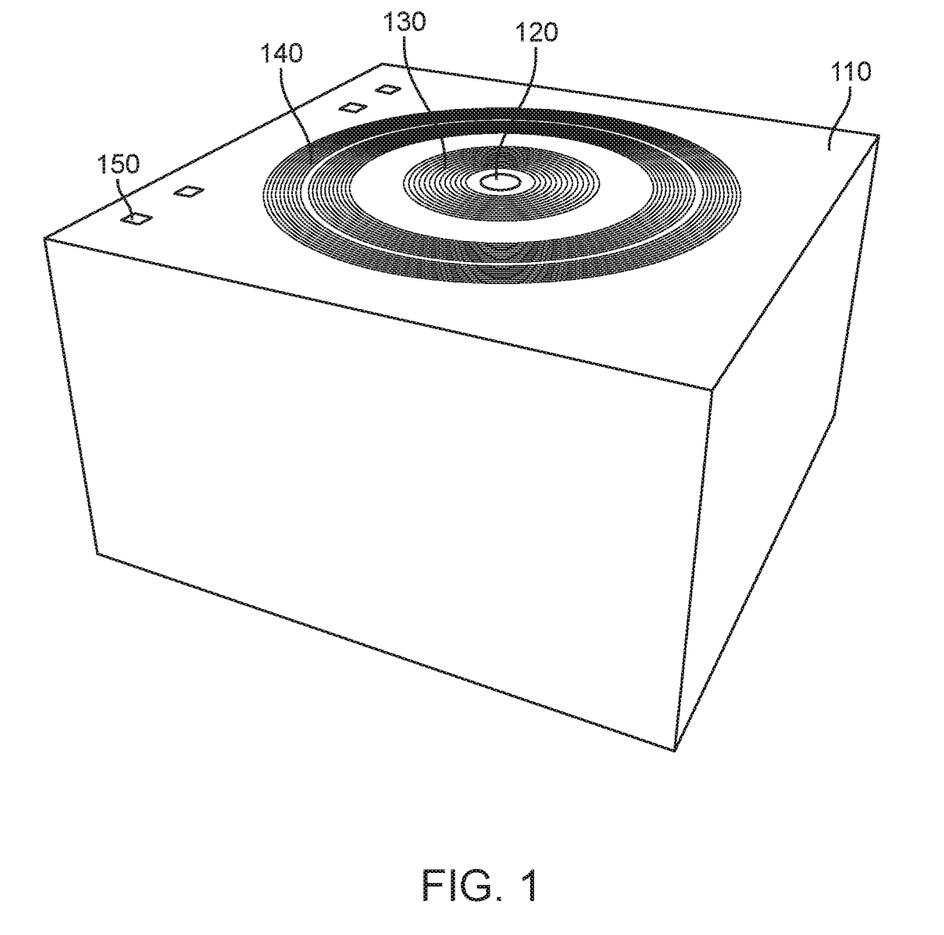
FIG. 1 illustrates a portion of a flow sensor according to an embodiment of the present invention.

FIG. 1 illustrates a portion of a flow sensor according to an embodiment of the present invention. This figure, as with the other included figures, is shown for illustrative purposes and does not limit either the possible embodiments of the present invention or the claims.

Figure 5:
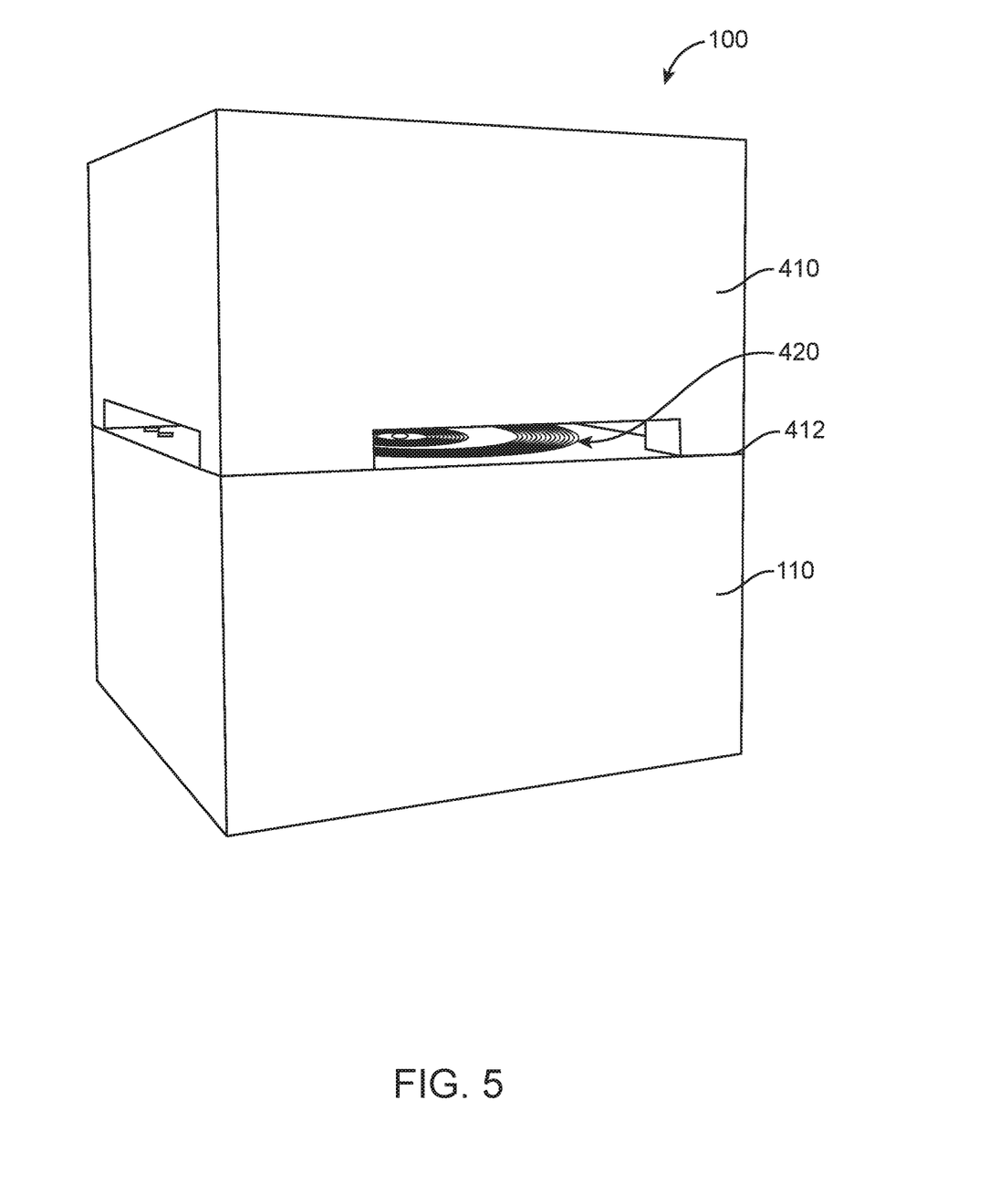
FIG. 5 is a bonded view of a flow sensor according to an embodiment of the present invention.

First silicon block 110 can be a portion of flow sensor 100 (shown in FIG. 5.) First silicon block 110 can include exit passage 120, around which can be arrayed one or more refractory resistors 140 and one or more sense resistors 130. Bondpads 150 can be used to electrically connect refractory resistor 140 and sense resistor 130 and other components on first silicon block 110 to other electronic circuits external to flow sensor 100.

Exit passage 120 can be defined by and manufactured using lithography and high-precision semiconductor manufacturing equipment, for example using a deep-reactive-ion etch (DRIE) or other technique. As a result, a size, shape, and volume of exit passage 120 can be tightly controlled. This high degree of precision and control can mean that flow measurement readings can be consistent from one flow sensor to another, since they should have very similar dimensions.

Also, since exit passage 120 can be cut into monolithic first silicon block 110, the thermomechanical properties of exit passage 120 can be both simple and also well understood and therefore predictable. This predictability can allow for compensation of these effects. For example, since the expansion of silicon over temperature is well understood, the effects of this expansion can be readily predicted. This can allow flow rate measurements to be corrected as a function of temperature.

Figure 2:
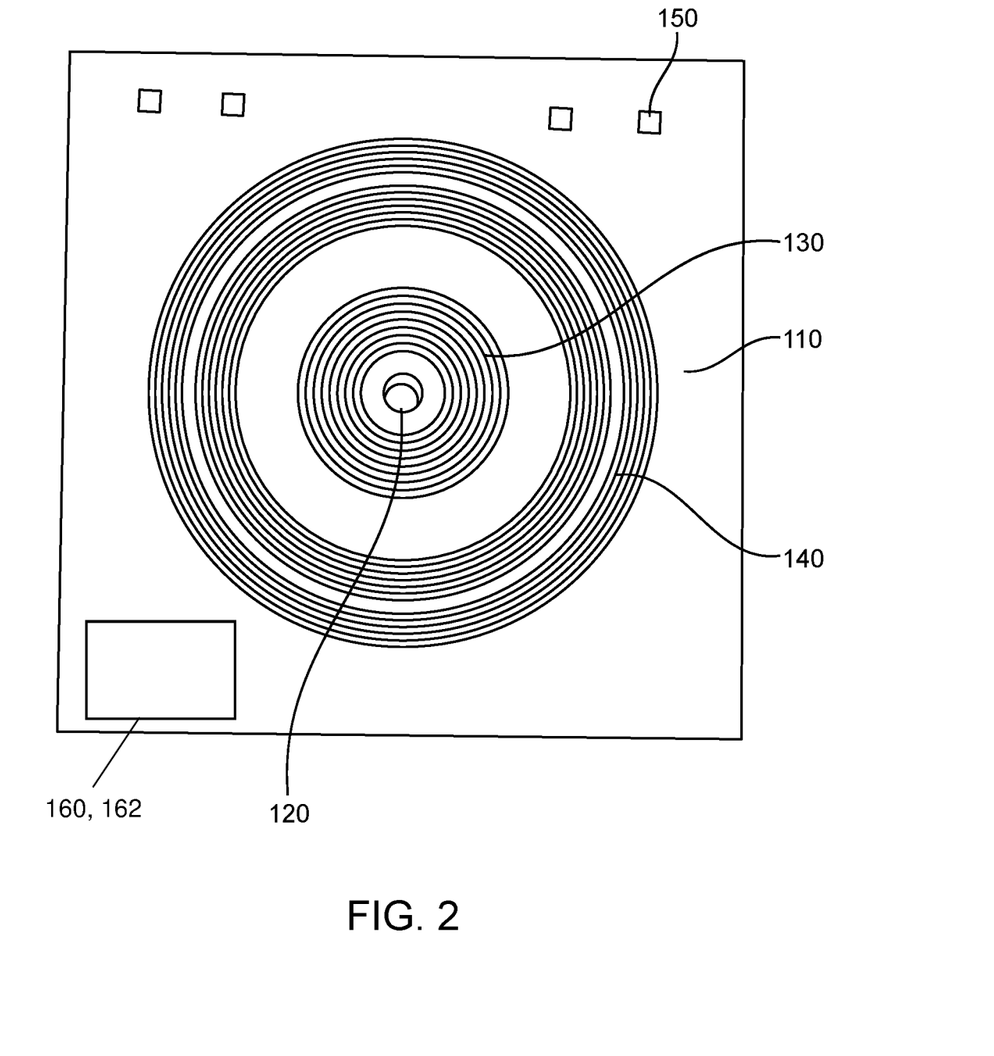
FIG. 2 illustrates a top view of a portion of a flow sensor according to an embodiment of the present invention.

FIG. 2 illustrates a top view of a portion of a flow sensor according to an embodiment of the present invention. Gas or other fluid 300 (shown in FIG. 3) can be driven by a pressure gradient from the top surface of the device through the exit passage 120 in first silicon block 110 and out the bottom (not shown) of first silicon block 110. The outer resistor ring in this case can be the refractory resistor 140 and the inner resistor ring can be the sense resistor 130. In these and other embodiments of the present invention, a sense resistor can be positioned as resistor 140 and a refractory resistor can be positioned as resistor 130. Exit passage 120 can be located at or near a center of first silicon block 110.

First silicon block 110 can include one or more refractory resistors 140 and one or more sense resistors 130. For example, in these and other embodiments of the present invention, sense resistors 130 can be located on each side of refractory resistor 140. In this example, two resistors 130 and 140 are shown as concentric rings, though in these and other embodiments of the present invention, either or both of these resistors can have different shapes. Either or both of these resistors 130 and 140 can have a circular, polygonal, or other shape. Either or both resistors 130 and 140 can be formed as a spiral, such as an Archimedean spiral, involute, Fermat, or other type of spiral. They each can be formed as one or an array of lines. The can have the same or similar shapes as each other, or they can have different shapes. In these and other embodiments of the present invention, either or both of these resistors can be split into a series of two or more arcs, or two or more lines, or two or more arbitrary shapes. In these and other embodiments of the present invention, there can be a single refractory resistor 140 and a multiplicity of sense resistors 130, there can be a multiplicity of refractory resistors 140 and a single sense resistor 130, there can be one refractory resistor 140 and one sense resistor 130, or there can be a multiplicity of each. Refractory resistor 140 can be formed around inner sense resistor 130, as shown in this example, or again, a sense resistor can be formed around an inner refractory resistor.

Either or both resistors 130 and 140 can be made of implanted or diffused silicon, in which case they are flush with the surface of the first silicon block 110, or either or both can be made of refractory metals such as platinum or tungsten. They can also be made of doped polysilicon.

Because the devices rely on sensitivity to temperature, various enhancements are available to improve temperature sensitivity. One method is to mount sense resistors 130 on a thin membrane, reducing the surrounding thermal mass and thus giving rise to more rapid temperature changes. A second method is to etch trenches around the resistors 130 and 140, thereby, reducing thermal mass in the surrounding area.

Figure 3:
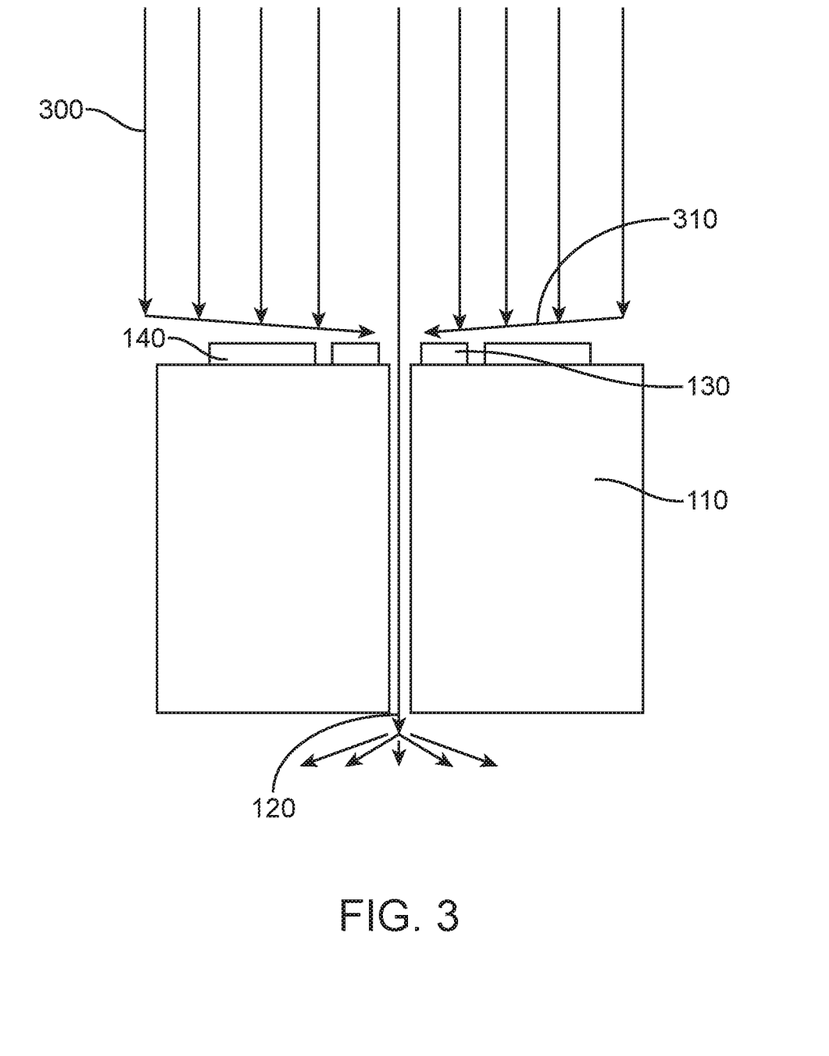
FIG. 3 illustrates a flow of gas in a flow sensor according to an embodiment of the present invention.

FIG. 3 shows how a gas or fluid can flow in a flow sensor according to an embodiment of the present invention. As gas or other fluid 300 flows through flow sensor 100 (shown in FIG. 5), it can be forced through exit passage 120 in or near the center of first silicon block 110. This can create a lateral flow 310 from the outer edges towards the center of first silicon block 110. This direction of flow can result in an increase in temperature of the inner sense resistor or resistors 130 as gas or other fluid 300 flows across heated refractory resistor 140, then over sense resistor 130, and through exit passage 120. In these and other embodiments of the present invention, the flow of gas or other fluid 300 can be from the backside of first silicon block 110 and out the top of first silicon block 110.

More specifically, a current can be driven through refractory resistor 140, thereby heating refractory resistor 140. Refractory resistor 140 can heat the gas or other fluid 300. The heated gas or other fluid 300 can then pass over sense resistor 130, thereby heating sense resistor 130. A current can be driven through sense resistor 130 and a resulting voltage measured. The resulting voltage divided by the current is the value of the sense resistor 130. The current in sense resistor 130 can be small to reduce self-heating. The value of sense resistor 130 can be used to determine a flow rate for gas or fluid 300. Gas or other fluid 300 can flow through exit passage 120 and out a bottom of first silicon block 110.

Figure 4:
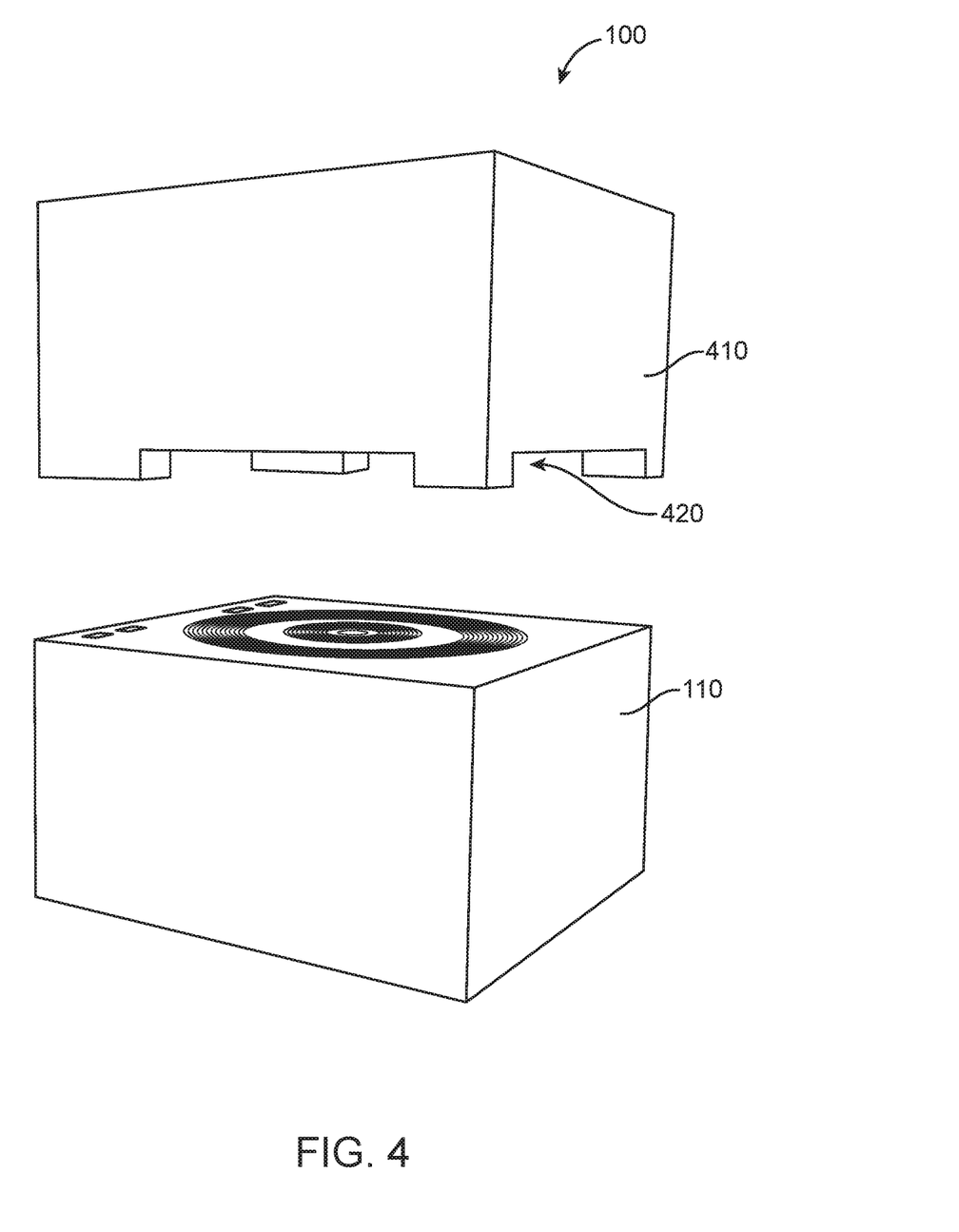
FIG. 4 is an exploded view of a flow sensor according to an embodiment of the present invention.

FIG. 4 is an exploded view of a flow sensor according to an embodiment of the present invention. This figure shows flow sensor 100, in which a more planar flow across the surface is provided by second silicon block 410. In flow sensor 100, second silicon block 410 having etched channels 420 can be bonded to a top surface of first silicon block 110. The resulting configuration can provide a flow sensor 100, where during operation gas or other fluid 300 (shown in FIG. 3) can be forced to move laterally across the top surface of first silicon block 110 to reach the lower-pressure exit passage 120.

Channels 420 can be defined by and manufactured using lithography and high-precision semiconductor manufacturing equipment, for example using a deep-reactive-ion etch (DRIE) or other technique. As a result, a size, shape, and volume of channels 420 can be tightly controlled. This high degree of precision and control can mean that flow measurement readings can be consistent from one flow sensor to another, since they should have very similar dimensions.

Also, since channels 420 can be cut into monolithic second silicon block 410, the thermomechanical properties of channels 420 can be both simple and also well understood and therefore predictable. This predictability can allow for compensation of these effects. For example, since the expansion of silicon over temperature is well understood, the effects of this expansion can be readily predicted. This can allow flow rate measurements to be corrected as a function of temperature.

FIG. 5 is an oblique view of a flow sensor according to an embodiment of the present invention. Second silicon block 410 can be bonded to first silicon block 110 at bond 412 to form flow sensor 100. Etched channels 420 can guide gas flow into the device and across the surface of first silicon block 110 and into exit passage 120, thereby improving planar or laminar flow for the flow sensor.

Additional circuitry 160 can be located on either or both of first silicon block 110 as shown in FIG. 2, or second silicon block 410 (both of which can be referred to as die) or other structures associated with first silicon block 110 or second silicon block 410. This circuitry 160 can include a current generator for providing and controlling a heating current for refractory resistor 140. This circuitry 160 can also include a current generator for providing a sense current for sense resistor 130. An analog-to-digital converter 162 and other circuits can be included in the circuitry 160 to convert a voltage across sense resistor 130 to a digital value. Signal conditioning or processing circuits can also be included.

In these and other embodiments of the present invention, exit passage 120 can be absent or omitted from a first silicon block. In these structures, the flow path can be through one or more channels in a second silicon block. An example is shown in the following figure.

Figure 6:
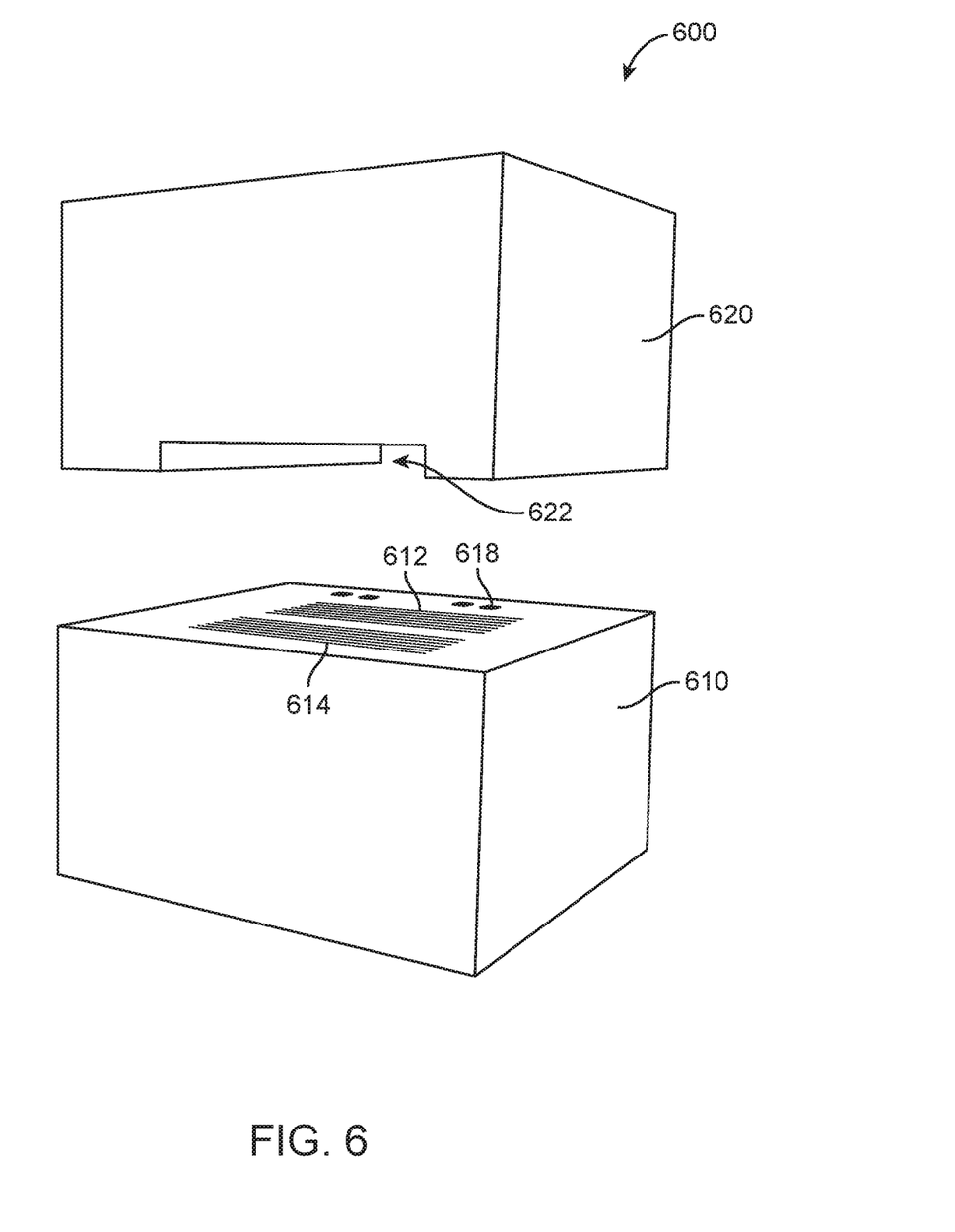
FIG. 6 illustrates another flow sensor according to an embodiment of the present invention.

FIG. 6 illustrates another flow sensor according to an embodiment of the present invention. First silicon block 610 can be a portion of flow sensor 600. First silicon block 610 can include one or more refractory resistors 614 and one or more sense resistors 612. For example, in these and other embodiments of the present invention, sense resistors 612 can be located on each side of refractory resistor 614. Bondpads 618 can be used to electrically connect refractory resistor 614 and sense resistor 612 and other components on first silicon block 610 to other electronic circuits external to flow sensor 600.

Channel 622 can be formed in second silicon block 620. Gas or other fluid 300 (shown in FIG. 3) can enter channel 622, passing over refractory resistor 614. A current can be driven through refractory resistor 614, thereby heating refractory resistor 614. Refractory resistor 614 can heat the gas or other fluid 300. The heated gas or other fluid 300 can then pass over sense resistor 612, thereby heating sense resistor 612. A current can be driven through sense resistor 612 and a resulting voltage measured. The current in sense resistor 612 can be small to reduce self-heating. The resulting voltage divided by the current is the value of the sense resistor 612. The value of sense resistor 612 can be used to determine a flow rate for gas or fluid 300. Gas or other fluid 300 can exit from channel 622 out a backside of flow sensor 600 (at a point near bondpads 618 as shown.) Either or both sense resistor 612 and refractory resistor 614 can be positioned in parallel, orthogonal to, or at another angle to the direction of fluid flow provided by channel 622.

Channel 622 can be defined by and manufactured using lithography and high-precision semiconductor manufacturing equipment, for example using a deep-reactive-ion etch (DRIE) or other technique. As a result, a size, shape, and volume of channel 622 can be tightly controlled. This high degree of precision and control can mean that flow measurement readings can be consistent from one flow sensor to another, since they should have very similar dimensions.

Also, since channel 622 can be cut into monolithic second silicon block 620, the thermomechanical properties of channel 622 can be both simple and also well understood and therefore predictable. This predictability can allow for compensation of these effects. For example, since the expansion of silicon over temperature is well understood, the effects of this expansion can be readily predicted. This can allow flow rate measurements to be corrected as a function of temperature.

In this example, refractory resistor 614 and sense resistor 612 are shown as parallel resistors formed as lines, though in these and other embodiments of the present invention, either or both of these resistors can have different shapes. Either or both of these resistors 612 and 614 can have a circular, polygonal, or other shape. Either or both resistors 612 and 614 can be formed as a spiral, such as an Archimedean spiral, involute, Fermat, or other type of spiral. They each can be formed as a line. The can have the same or similar shapes as each other, or they can have different shapes. In these and other embodiments of the present invention, either or both of these resistors can be split into a series of two or more arcs, or two or more lines, or two or more arbitrary shapes. In these and other embodiments of the present invention, there can be a single refractory resistor 614 and a multiplicity of sense resistors 612, there can be a multiplicity of refractory resistors 614 and a single sense resistor 612, there can be one refractory resistor 614 and one sense resistor 612, or there can be a multiplicity of each.

Either or both resistors 614 and 612 can be made of implanted or diffused silicon, in which case they are flush with the surface of the first silicon block 610, or either or both can be made of refractory metals such as platinum or tungsten. They can also be made of doped polysilicon.

Because the devices rely on sensitivity to temperature, various enhancements are available to improve temperature sensitivity. One method is to mount sense resistors 612 on a thin membrane, reducing the surrounding thermal mass and thus giving rise to more rapid temperature changes. A second method is to etch trenches around the resistors 612 and 614, thereby, reducing thermal mass in the surrounding area.

Additional circuitry can be located on either or both of second silicon block 620 or first silicon block 610 (both of which can be referred to as die) or other structures associated with second silicon block 620 or first silicon block 610. This circuitry can include a current generator for providing and controlling a heating current for refractory resistor 614. This circuitry can also include a current generator for providing a sense current for sense resistor 612. An analog-to-digital converter and other circuitry can be included to convert a voltage across sense resistor 612 to a digital value. Signal conditioning or processing circuits can also be included.

Figure 7:
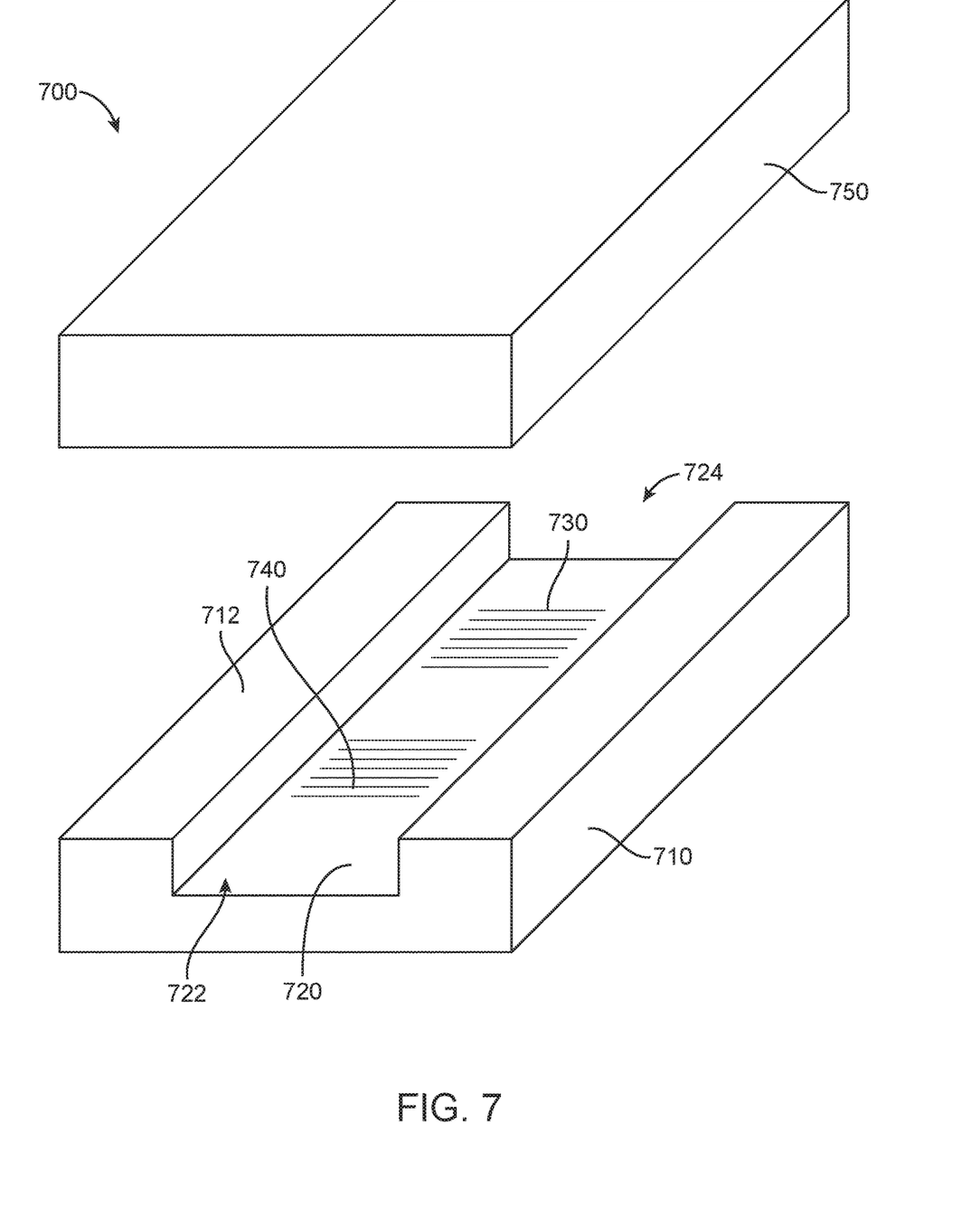
FIG. 7 illustrates a portion of another flow sensor according to an embodiment of the present invention.

FIG. 7 illustrates a portion of another flow sensor according to an embodiment of the present invention. First silicon block 710 can be a portion of flow sensor 700. First silicon block 710 can include one or more refractory resistors 740 and one or more sense resistors 730. For example, in these and other embodiments of the present invention, sense resistors 730 can be located on each side of refractory resistor 740. Bondpads (not shown) can be used to electrically connect refractory resistor 740 and sense resistor 730 and other components on first silicon block 710 to other electronic circuits external to flow sensor 700.

Channel 720 can be formed in first silicon block 710. The one or more refractory resistors 740 and one or more sense resistors 730 can be formed in channel 720. A cover 750 formed of a second silicon block, a board, or other substrate can be attached by bonding, adhesive, or other method or substance, to surfaces 712 of first silicon block 710 to form a flow path including channel 720.

During operation, gas or other fluid 300 (shown in FIG. 3) can enter channel 720 at inlet 722, passing over refractory resistor 740. A current can be driven through refractory resistor 740, thereby heating refractory resistor 740. Refractory resistor 740 can heat the gas or other fluid 300. The heated gas or other fluid 300 can then pass over sense resistor 730, thereby heating sense resistor 730. A current can be driven through sense resistor 730 and a resulting voltage measured. The current in sense resistor 730 can be small to reduce self-heating. The resulting voltage divided by the current is the value of the sense resistor 730. The value of sense resistor 730 can be used to determine a flow rate for gas or fluid 300. Gas or other fluid 300 can exit from channel 720 at outlet 724. Either or both sense resistor 730 and refractory resistor 740 can be positioned in parallel, orthogonal to, or at another angle to the direction of fluid flow provided by channel 720.

Channel 720 can be defined by and manufactured using lithography and high-precision semiconductor manufacturing equipment, for example using a deep-reactive-ion etch (DRIE) or other technique. As a result, a size, shape, and volume of channel 720 can be tightly controlled. This high degree of precision and control can mean that flow measurement readings can be consistent from one flow sensor to another, since they should have very similar dimensions.

Also, since channel 720 can be cut into monolithic first silicon block 710, the thermomechanical properties of channel 720 can be both simple and also well understood and therefore predictable. This predictability can allow for compensation of these effects. For example, since the expansion of silicon over temperature is well understood, the effects of this expansion can be readily predicted. This can allow flow rate measurements to be corrected as a function of temperature.

In this example, refractory resistor 740 and sense resistor 730 are shown as parallel resistors formed as lines, though in these and other embodiments of the present invention, either or both of these resistors can have different shapes. Either or both of these resistors 730 and 740 can have a circular, polygonal, or other shape. Either or both resistors 730 and 740 can be formed as a spiral, such as an Archimedean spiral, involute, Fermat, or other type of spiral. They each can be formed as a line. The can have the same or similar shapes as each other, or they can have different shapes. In these and other embodiments of the present invention, either or both of these resistors can be split into a series of two or more arcs, or two or more lines, or two or more arbitrary shapes. In these and other embodiments of the present invention, there can be a single refractory resistor 740 and a multiplicity of sense resistors 730, there can be a multiplicity of refractory resistors 740 and a single sense resistor 730, there can be one refractory resistor 740 and one sense resistor 730, or there can be a multiplicity of each.

Either or both resistors 740 and 730 can be made of implanted or diffused silicon, in which case they are flush with the surface of the first silicon block 710, or either or both can be made of refractory metals such as platinum or tungsten. They can also be made of doped polysilicon.

Because the devices rely on sensitivity to temperature, various enhancements are available to improve temperature sensitivity. One method is to mount sense resistors 730 on a thin membrane, reducing the surrounding thermal mass and thus giving rise to more rapid temperature changes. A second method is to etch trenches around the resistors 730 and 740, thereby, reducing thermal mass in the surrounding area.

Additional circuitry can be located on either or both of first silicon block 710 or cover 750, or other structures associated with first silicon block 710 or cover 750. This circuitry can include a current generator for providing and controlling a heating current for refractory resistor 740. This circuitry can also include a current generator for providing a sense current for sense resistor 730. An analog-to-digital converter and other circuitry can be included to convert a voltage across sense resistor 730 to a digital value. Signal conditioning or processing circuits can also be included.

The various flow sensors described above, as well as other flow sensors provided by embodiments of the present invention, can be driven by an analog voltage or current. These flow sensors can provide an analog voltage or current output signal. Various signal processing circuits (not shown) that can be specifically developed or commercially available can be used to simplify the interpretation of the signal coming from the flow sensors. One implementation of the flow sensors maintains a constant current flow through the refractory sensor and read out changes in the sense resistor's resistance, which can vary as the flow rate changes. Another method is to force the current in the refractory material to vary in such a manner that the temperature of the sense resistor remains constant. Another method is to provide a current pulse to a refractory resistor to generate a heating pulse, and measure the time for the heating pulse to be sensed at the sense resistor.

Flow rate can be derived from sense resistor resistance in several ways. For example, gas or other fluid flow can be varied in a known manner and the resulting resistance measured. The relationship between gas and fluid flow and resulting resistance can be found and used during flow sensor operation to determine gas or fluid flow from sense resistor resistance. The relationship between gas and fluid flow and resulting resistance can be found at different temperatures. During operation, a temperature of the flow sensor can be used to calibrate the measured sense resistor resistance, and thus gas or fluid flow, for temperature.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A flow sensor comprising: a first silicon block comprising: a top surface and a bottom surface, and a passage extending from the top surface to the bottom surface; a sense resistor circumferentially located around an opening in the top surface, the opening in the top surface formed by the passage; and a refractory resistor circumferentially located around the opening in the top surface; and a second silicon block comprising: a channel to direct a gas flow across the top surface of the first silicon block.

2. The flow sensor of claim 1, wherein the refractory resistor is one of a plurality of refractory resistors circumferentially located around the sense resistor, and the sense resistor is one of a plurality of sense resistors.

3. The flow sensor of claim 2, wherein the refractory resistor and the sense resistor are circular.

4. The flow sensor of claim 2, wherein the first silicon block is bonded to the second silicon block.

5. The flow sensor of claim 2, wherein the channel is formed using a deep-reactive-ion etch.

6. A flow sensor comprising:
a first silicon block comprising:
a top surface;
a sense resistor located on the top surface;
a refractory resistor located on the top surface and apart from the sense resistor; and
a passage through the first silicon block, the sense resistor is circumferentially located around an opening in the top surface formed by the passage and the refractory resistor is circumferentially located around the opening in the top surface, the refractory resistor is circumferentially located around the sense resistor or the sense resistor is circumferentially located around the refractory resistor; and
a second silicon block comprising:
a channel to direct a gas flow across the top surface of the first silicon block.

7. The flow sensor of claim 6, wherein channel directs a gas flow from the refractory resistor towards the sense resistor.

8. The flow sensor of claim 7, wherein the channel is formed using a deep-reactive-ion etch.

9. A flow sensor system comprising:
a flow sensor comprising:
a first silicon block comprising:
a top surface;
a sense resistor located on the top surface;
a refractory resistor located on the top surface and apart from the sense resistor; and
a passage through the first silicon block, the sense resistor is circumferentially located around an opening in the top surface formed by the passage and the refractory resistor is circumferentially located around the opening in the top surface, the refractory resistor is circumferentially located around the sense resistor or the sense resistor is circumferentially located around the refractory resistor; and
a second silicon block comprising:
a channel to direct a gas flow across the top surface of the first silicon block; and
circuitry for operating the flow sensor and comprising:
a first current source to provide a first current to the refractory resistor; and
a second current source to provide a second current to the sense resistor.

10. The flow sensor system of claim 9, wherein the circuitry further comprises: an analog-to-digital converter to convert a voltage across the sense resistor to a digital value.

11. The flow sensor system of claim 10, wherein the circuitry is located on the first silicon block.

* * * * *